US012548351B2

(12) United States Patent
Cho et al.

(10) Patent No.: US 12,548,351 B2
(45) Date of Patent: Feb. 10, 2026

(54) VISION-BASED MACHINE LEARNING MODEL FOR LANE CONNECTIVITY IN AUTONOMOUS OR SEMI-AUTONOMOUS DRIVING

(71) Applicant: Tesla, Inc., Austin, TX (US)

(72) Inventors: Patrick Cho, Austin, TX (US); Ethan Knight, Austin, TX (US); Tony Duan, Austin, TX (US); Alex Xiao, Austin, TX (US); Jason Lee, Austin, TX (US)

(73) Assignee: Tesla, Inc., Austin, TX (US)

( * ) Notice: Subject to any disclaimer, the term of this patent is extended or adjusted under 35 U.S.C. 154(b) by 193 days.

(21) Appl. No.: 18/452,466

(22) Filed: Aug. 18, 2023

(65) Prior Publication Data

US 2024/0062556 A1 Feb. 22, 2024

Related U.S. Application Data

(60) Provisional application No. 63/373,013, filed on Aug. 19, 2022.

(51) Int. Cl.
*G06V 20/56* (2022.01)
*G06V 10/44* (2022.01)
*G06V 10/80* (2022.01)
*G06V 10/82* (2022.01)

(52) U.S. Cl.
CPC ......... *G06V 20/588* (2022.01); *G06V 10/457* (2022.01); *G06V 10/80* (2022.01); *G06V 10/82* (2022.01)

(58) Field of Classification Search
CPC ................... G06V 20/588; G06T 2207/30236
See application file for complete search history.

(56) References Cited

U.S. PATENT DOCUMENTS

| | | | | |
|---|---|---|---|---|
| 11,921,824 B1* | 3/2024 | Hester | ................... | G06N 3/045 |
| 12,254,424 B2* | 3/2025 | Omari | ................... | G08G 1/056 |
| 2019/0258251 A1* | 8/2019 | Ditty | ................... | G05D 1/0274 |
| 2019/0266417 A1* | 8/2019 | Wette | ................... | G06N 3/0499 |
| 2020/0125994 A1* | 4/2020 | Hsu | ................... | G05D 1/0088 |
| 2021/0001877 A1* | 1/2021 | Han | ................... | B60W 40/02 |
| 2022/0165060 A1* | 5/2022 | Eichel | ................... | G06V 20/54 |
| 2022/0198198 A1* | 6/2022 | Marcotte | ................... | G01C 21/3822 |
| 2023/0122119 A1* | 4/2023 | Wu | ................... | G05D 1/0289 |
| | | | | 701/301 |
| 2023/0195122 A1* | 6/2023 | Shenfeld | ................... | G06V 20/588 |
| | | | | 701/26 |
| 2023/0251103 A1* | 8/2023 | Yong | ................... | G01C 21/3484 |
| | | | | 701/424 |
| 2023/0294742 A1* | 9/2023 | Epstein | ................... | G06V 10/44 |
| | | | | 701/26 |
| 2023/0377348 A1* | 11/2023 | Wilson | ................... | G06T 5/70 |

* cited by examiner

*Primary Examiner* — Frank Johnson
(74) *Attorney, Agent, or Firm* — Foley & Lardner LLP

(57) ABSTRACT

Systems and methods for a vision-based machine learning model for lane connectivity in autonomous or semi-autonomous driving. An example method includes obtaining images from a multitude of image sensors positioned about a vehicle; compute forward pass-through backbone networks of a machine learning model, wherein the output of the backbone networks are fused via a transformer network; aggregating information output from the transformer network across time and/or space; and determining lane connectivity information.

20 Claims, 10 Drawing Sheets

VISION-BASED MACHINE LEARNING MODEL FOR LANE CONNECTIVITY IN AUTONOMOUS OR SEMI-AUTONOMOUS DRIVING

CROSS-REFERENCE TO RELATED APPLICATIONS

This application claims priority to U.S. Prov. Patent App. No. 63/373,013 titled "VISION-BASED MACHINE LEARNING MODEL FOR LANE CONNECTIVITY IN AUTONOMOUS OR SEMI-AUTONOMOUS DRIVING" and filed on Apr. 19, 2022, the disclosure of which is hereby incorporated herein by reference in its entirety.

BACKGROUND

Technical Field

The present disclosure relates to machine learning models, and more particularly, to machine learning models using vision information.

Description of Related Art

Neural networks are relied upon for disparate uses and are increasingly forming the underpinnings of technology. For example, a neural network may be leveraged to perform object classification on an image obtained via a user device (e.g., a smart phone). In this example, the neural network may represent a convolutional neural network which applies convolutional layers, pooling layers, and one or more fully-connected layers to classify objects depicted in the image. As another example, a neural network may be leveraged for translation of text between languages. For this example, the neural network may represent a recurrent-neural network.

Complex neural networks are additionally being used to enable autonomous or semi-autonomous driving functionality for vehicles. For example, an unmanned aerial vehicle may leverage a neural network, in part, to enable navigation about a real-world area. In this example, the unmanned aerial vehicle may leverage sensors to detect upcoming objects and navigate around the objects. As another example, a car or truck may execute neural network(s) to navigate about a real-world area. At present, such neural networks may rely upon costly, or error-prone, sensors. Additionally, such neural networks may lack accuracy with respect to detecting and classifying moving and stationary (e.g., fixed) objects causing deficient autonomous or semi-autonomous driving performance.

Figure 1A:
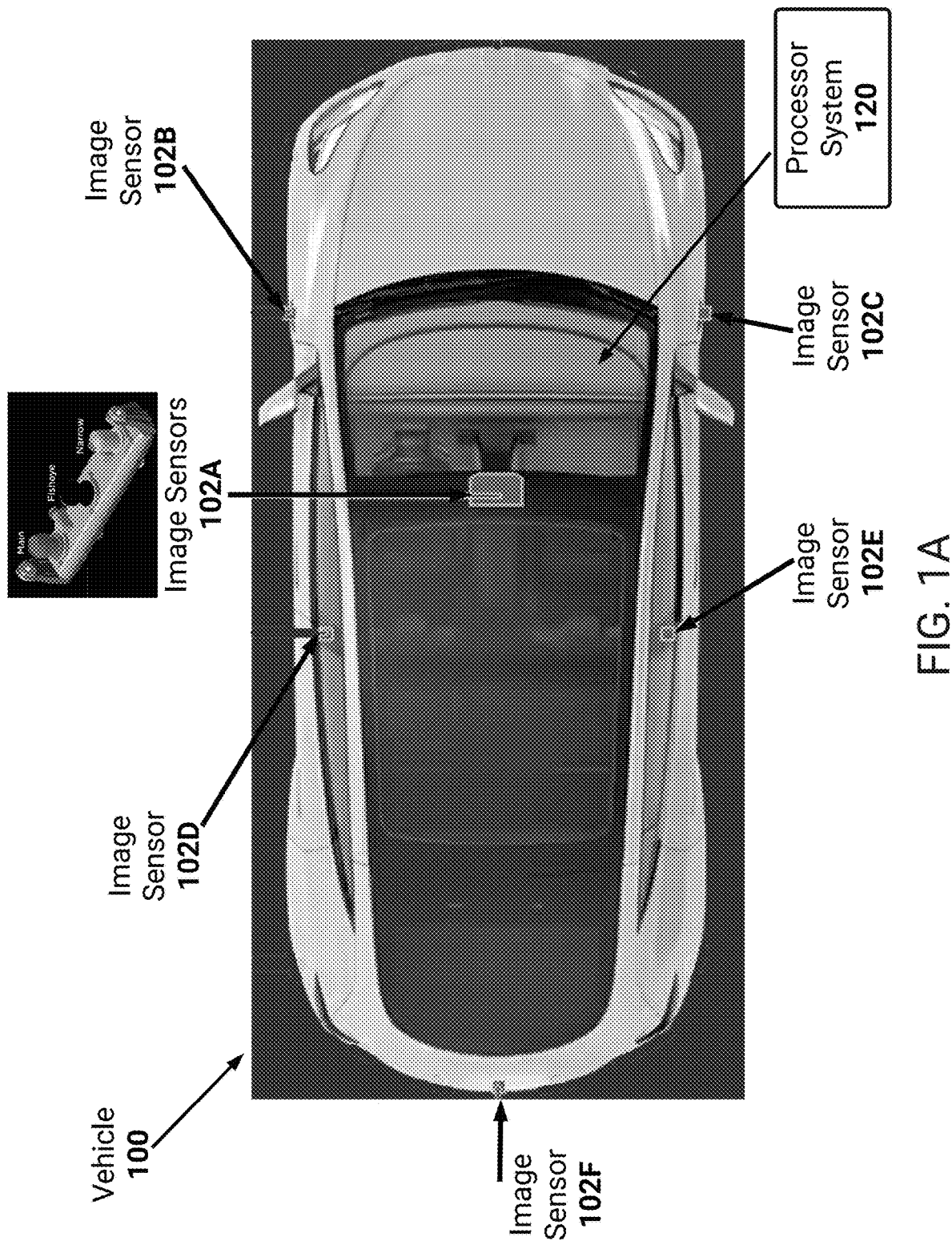
FIG. 1A is a block diagram illustrating an example autonomous or semi-autonomous vehicle which includes a multitude of image sensors an example processor system.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Introduction

This application enhanced techniques for autonomous or semi-autonomous (collectively referred to herein as autonomous) driving of a vehicle using image sensors (e.g., cameras) positioned about the vehicle. Thus, the vehicle may navigate about a real-world area using vision-based sensor information. As may be appreciated, humans are capable of driving vehicles using vision and a deep understanding of their real-world surroundings. For example, humans are capable of rapidly identifying objects (e.g., pedestrians, road signs, lane markings, vehicles) and using these objects to inform driving of vehicles. Increasingly, machine learning models are capable of identifying and characterizing objects positioned about vehicles. However, such machine learning models are prone to errors introduced through unsophisticated models and/or inconsistencies introduced through disparate sensors.

This application specifically addresses prior shortcomings associated with autonomous vehicles identifying lane connectivity. For example, as an autonomous vehicle approaches an intersection the autonomous vehicle requires an understanding of which lanes connect with which other lanes across the intersection. In this example, the autonomous vehicle may be required to autonomous drive across the intersection such that it stays substantially in a same lane as prior to the intersection. However, as may be appreciated lanes across the intersection may merge, be adjusted in position, and so on, such that this driving presents technological hurdles. Additionally, for complex intersections (e.g., 5-way intersections or more), it may be unclear which lanes prior to an intersection are meant to correspond with which lanes after the intersection.

One example technique to determine lane connectivity is based on a birds-eye view projection of static objects positioned about an autonomous vehicle. For example, images obtained from image sensors of the autonomous vehicle may be provided to a processor system of the autonomous vehicle. In this example, the processor system may compute a forward pass through a birds-eye view network which outputs disparate information. Example information may be encoded, or otherwise provided in a form associated with, respective images. For example, an image may indicate lanes which are connected with other lanes positioned about the autonomous vehicle. In this example, the image may include points (e.g., a bag of points) which are indicative of lanes. In some embodiments of the birds-eye view network, the points may be assigned colors to indicate connectivity. In some embodiments of the birds-eye view network, the points may be used to determine, or otherwise assign, splines which extend across an intersection to indicate connectivity.

While this birds-eye view may be advantageous in certain instances, this application describes use of a lane connectivity network which autoregressively identifies points and characterizes the points as forming part of a lane. In some embodiments, aspects of the lane connectivity network may be similar to a language model (e.g., an autoregressive language neural network). For example, the lane connectivity network may include a transformer network with one or more autoregressive blocks. Example autoregressive blocks may include transformer blocks, such as decoder blocks, encoder blocks, or encoder/decoder blocks. As will be described, the lane connectivity network may autoregressively label points with associated characterizations, similar to that of describing the lanes in one or more sentences. For example, the lane connectivity network may describe a lane as including a multitude of points which may extend across an intersection. Additionally, the lane connectivity network may describe multiple lanes as including respective points which extend across an intersection. The lane connectivity network may characterize certain points as being, for example, merge points, forking points, and so on. The lane connectivity network may additionally characterize points as being in a lane which is characterized by an estimate width. The characterization of these points may allow for a spline, or other connection scheme, to be determined for the points in a lane.

In this way, the application describes a specialty network which focuses on enhancing the accuracy of lane connectivity. As may be appreciated, description herein related to specific layers, blocks, and so on, of the lane connectivity network may be adjusted and fall within the scope of the disclosure. For example, more, or less, autoregressive blocks may be used. As another example, different types of autoregressive blocks may be used and fall within the scope of the disclosure herein.

While the description herein focuses on lane connectivity, and specifically autoregressive blocks (e.g., transformer blocks, such as encoders, decoders, encoder/decoders, or other autoregressive blocks), in some embodiments the network described herein may determine additional, or different, information. For example, the network may predict car trajectories or positions. In this example, the network may predict coordinates of trajectories corresponding to other vehicles. As an example, a vehicle positioned proximate to ego (e.g., a vehicle executing the network) may be identified based on received image data. For this example, the network described herein may characterize the vehicle's position. Additionally, the network may estimate future positions of the vehicle via autoregressive execution. In this way, the future trajectory may be estimated optionally until a threshold time step or inference. Similarly, the network may estimate ego's location such as estimating future positions, and thus a future trajectory which is formed from the positions, for ego.

Block Diagram—Vehicle Processing System/Lane Connectivity Network

FIG. 1A is a block diagram illustrating an example autonomous vehicle 100 which includes a multitude of image sensors 102A-102F and an example processor system 120. The image sensors 102A-102F may include cameras which are positioned about the vehicle 100. For example, the cameras may allow for a substantially 360-degree view around the vehicle 100.

The image sensors 102A-102F may obtain images which are used by the processor system 120 to, at least, determine information associated with objects positioned proximate to the vehicle 100. The images may be obtained at a particular frequency, such as 30 Hz, 36 Hz, 60 Hz, 65 Hz, and so on. In some embodiments, certain image sensors may obtain images more rapidly than other image sensors. As will be described below, these images may be processed by the processor system 120 based on the lane connectivity network 200 described herein.

Image sensor A 102A may be positioned in a camera housing near the top of the windshield of the vehicle 100. For example, the image sensor A 102A may provide a forward view of a real-world environment in which the vehicle is driving. In the illustrated embodiment, image sensor A 102A includes three image sensors which are laterally offset from each other. For example, the camera housing may include three image sensors which point forward. In this example, a first of the image sensors may have a wide-angled (e.g., fish-eye) lens. A second of the image sensors may have a normal or standard lens (e.g., 35 mm equivalent focal length, 50 mm equivalent, and so on). A third of the image sensors may have a zoom or narrow-view lens. In this way, three images of varying focal lengths may be obtained in the forward direction by the vehicle 100.

Image sensor B 102B may be rear-facing and positioned on the left side of the vehicle 100. For example, image sensor B 102B may be placed on a portion of the fender of the vehicle 100. Similarly, Image sensor C 102C may be rear-facing and positioned on the right side of the vehicle 100. For example, image sensor C 102C may be placed on a portion of the fender of the vehicle 100.

Image sensor D 102D may be positioned on a door pillar of the vehicle 100 on the left side. This image sensor 102D may, in some embodiments, be angled such that it points downward and, at least in part, forward. In some embodiments, the image sensor 102D may be angled such that it points downward and, at least in part, rearward. Similarly, image sensor E 102E may be positioned on a door pillow of the vehicle 100 on the right side. As described above, image sensor E 102E may be angled such that it points downwards and either forward or rearward in part.

Image sensor F 102F may be positioned such that it points behind the vehicle 100 and obtains images in the rear direction of the vehicle 100 (e.g., assuming the vehicle 100 is moving forward). In some embodiments, image sensor F 102F may be placed above a license plate of the vehicle 100.

While the illustrated embodiments include image sensors 102A-102F, as may be appreciated additional, or fewer, image sensors may be used and fall within the techniques described herein.

The processor system 120 may obtain images from the image sensors 102A-102F and determine lane connectivity information. Based on the information, the processor system 120 may adjust one or more driving characteristics or features. For example, the processor system 120 may cause the vehicle 100 to turn, slow down, brake, speed up, and so on. While not described herein, as may be appreciated the processor system 120 may execute one or more planning and/or navigation engines or models which use output from the lane connectivity network to effectuate autonomous driving.

In some embodiments, the processor system 120 may include one or more matrix processors which are configured to rapidly process information associated with machine learning models (e.g., convolutional neural networks, transformer networks, and so on). The processor system 120 may be used, in some embodiments, to perform convolutions associated with forward passes through a convolutional neural network. For example, input data and weight data may be convolved. The processor system 120 may include a multitude of multiply-accumulate units which perform the convolutions. As an example, the matrix processor may use input and weight data which has been organized or formatted to facilitate larger convolution operations.

For example, input data may be in the form of a three-dimensional matrix or tensor (e.g., two-dimensional data across multiple input channels). In this example, the output data may be across multiple output channels. The processor system 120 may thus process larger input data by merging, or flattening, each two-dimensional output channel into a vector such that the entire, or a substantial portion thereof, channel may be processed by the processor system 120. As another example, data may be efficiently re-used such that weight data may be shared across convolutions. With respect to an output channel, the weight data 106 may represent weight data (e.g., kernels) used to compute that output channel.

Additional example description of the processor system, which may use one or more matrix processors, is included in U.S. Pat. Nos. 11,157,287, 11,409,692, and 11,157,441, which are hereby incorporated by reference in their entirety and form part of this disclosure as if set forth herein.

Figure 1B:
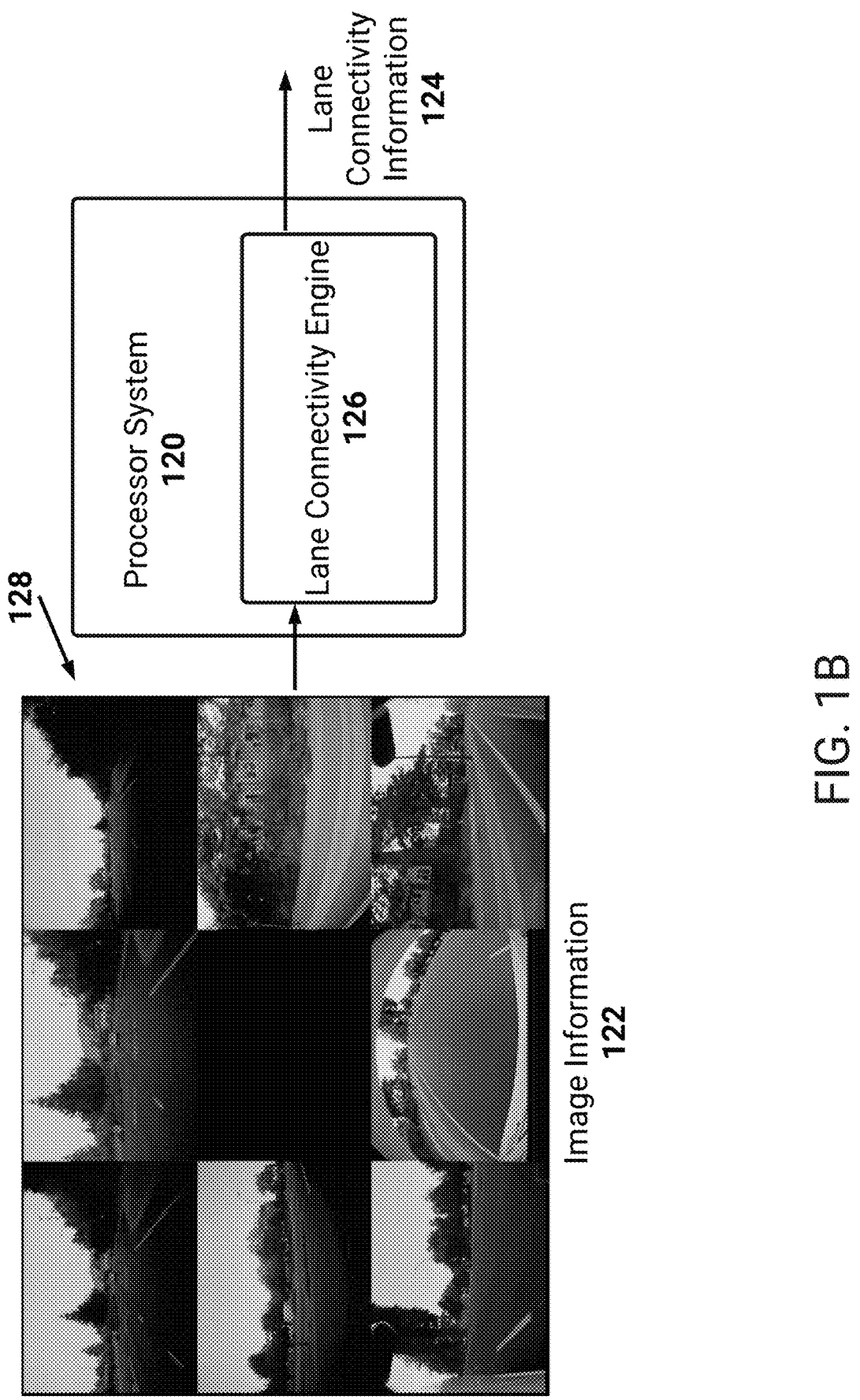
FIG. 1B is a block diagram illustrating the example processor system determining static information based on received image information from the example image sensors.

FIG. 1B is a block diagram illustrating the example processor system 120 determining lane connectivity information 124 based on received image information 122 from the example image sensors described above.

The image information 122 includes images from image sensors positioned about a vehicle (e.g., vehicle 100). In the illustrated example of FIG. 1A, there are 8 image sensors and thus 8 images are represented in FIG. 1B. For example, a top row of the image information 122 includes three images from the forward-facing image sensors. As described above, the image information 122 may be received at a particular frequency such that the illustrated images represent a particular time stamp of images. In some embodiments, the image information 122 may represent high dynamic range (HDR) images. For example, different exposures may be combined to form the HDR images. As another example, the images from the image sensors may be pre-processed to convert them into HDR images (e.g., using a machine learning model).

In some embodiments, each image sensor may obtain multiple exposures each with a different shutter speed or integration time. For example, the different integration times may be greater than a threshold time difference apart. In this example, there may be three integration times which are, in some embodiments, about an order of magnitude apart in time. The processor system 120, or a different processor, may select one of the exposures based on measures of clipping associated with images. In some embodiments, the processor system 120, or a different processor may form an image based on a combination of the multiple exposures. For example, each pixel of the formed image may be selected from one of the multiple exposures based on the pixel not including values (e.g., red, green, blue) values which are clipped (e.g., exceed a threshold pixel value).

The processor system 120 may execute the lane connectivity engine 126. An example of the lane connectivity network, implemented by the engine 126, is described in more detail below, with respect to FIG. 2. As described herein, the lane connectivity network may combine information included in the images. For example, each image may be provided to a particular backbone network. In some embodiments, the backbone networks may represent convolutional neural networks. Outputs of these backbone networks may then, in some embodiments, be combined (e.g., formed into a tensor) or may be provided as separate tensors to one or more further portions of the model. In some embodiments, an attention network (e.g., cross-attention) may receive the combination or may receive input tensors associated with each image sensor. In some embodiments, the attention network may project information into an overhead, or birds-eye view. For example, the attention network may fuse information together (e.g., feature information) from the backbone networks.

Additionally, and as will be described, the lane connectivity engine 126 may aggregate information which is spread across time. For example, a video queue or module may be used to aggregate information which is determined as the autonomous vehicle navigates in a real-world environment. In this example, the aggregated information may represent output from the attention network for prior points in time. The information may be aggregated over a prior amount of time, for example to track objects which may be expected to move in time. As another example, the aggregated information may represent output from the attention network for prior positions of the autonomous vehicle. The information may be aggregated over prior movements of the vehicle (e.g., the last 10 meters, 25 meters, 75 meters, and so on), for example to track objects which may not be expected to move in time. For example, static objects (e.g., lane lines) and so on may be expected to be spatially fixed. Thus, in some embodiments, the video module may spatially index output from the attention network.

The aggregated information may be aligned, for example using frame alignment techniques. As an example, objects may be positioned different in a first feature output as compared to. Second feature output when the autonomous vehicle is driven further. For example, a portion of a lane line may be in a first position relative to the autonomous vehicle in the first feature output. In this example, the portion of the lane line may be in a second position (e.g., further behind the vehicle, closer to the vehicle, and so on) as the vehicle drives. Thus, frame alignment techniques may be used to ensure that the portion of the lane line is consistently identified, or otherwise associated, in the first feature output and second feature output.

The output of the frame alignment may be provided to a multitude of autoregressive blocks. These autoregressive blocks may cause identification and characterization of points included in lanes positioned about the autonomous vehicle. For example, a sentence which describes the output may be generated. In this example, the sentence may cause identification of successive spatial points included in a lane (e.g., points further from the vehicle which are between lane lines) along with attributes of the points.

Figure 2A:
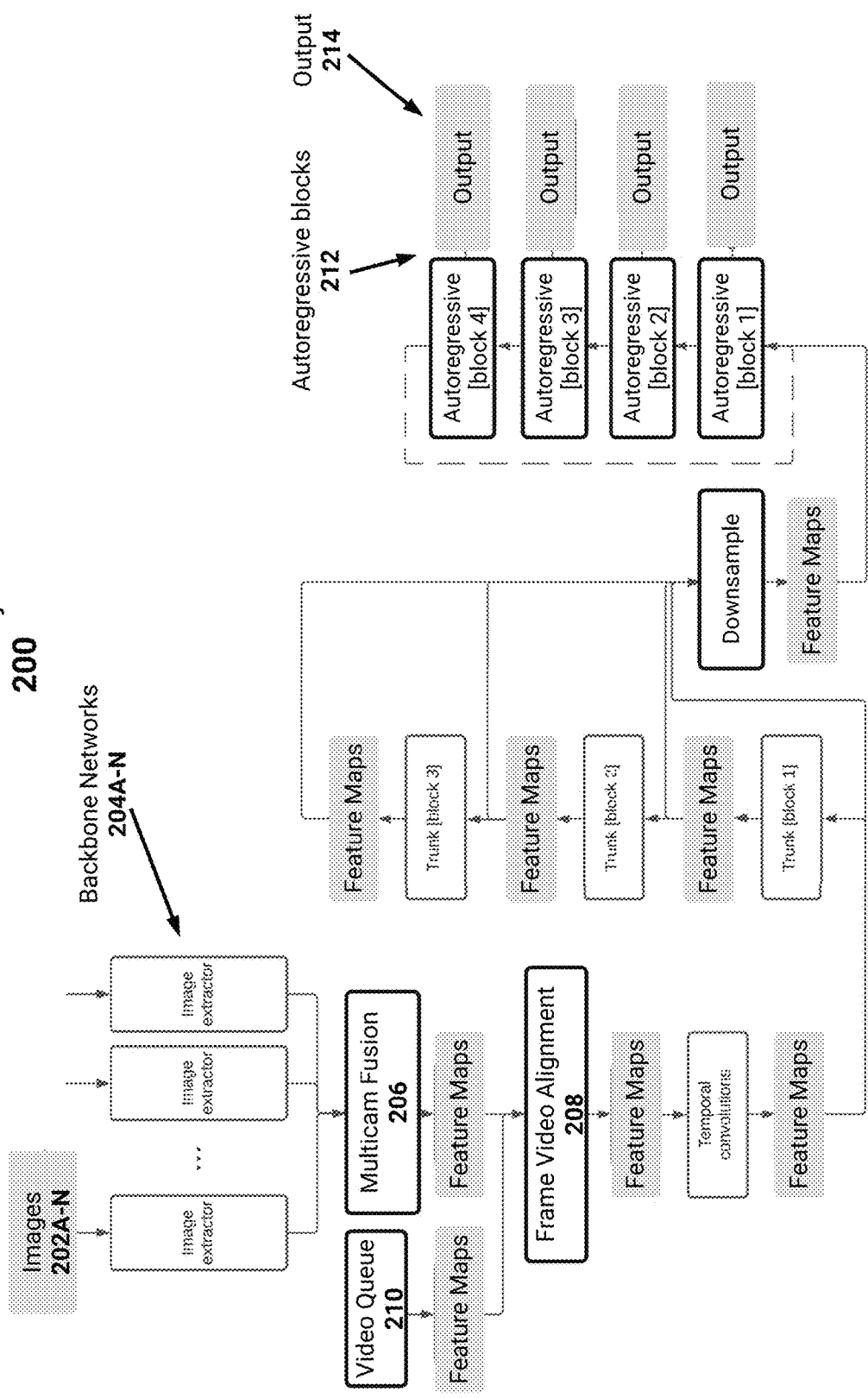
FIG. 2A is a block diagram of an example lane connectivity network.

FIG. 2A is a block diagram of an example lane connectivity network 200. The example network 200 may be executed by an autonomous vehicle, such as vehicle 100. Thus, actions of the model may be understood to be performed by a processor system (e.g., system 120) included in the vehicle.

In the illustrated example, images 202A-202N are received by the network 200. These images 202A-202N may be obtained from image sensors positioned about the vehicle, such as image sensors 102A-102F. The network 200 includes backbone networks 204A-N which receive respective images as input. Thus, the backbone networks 204A-N process the raw pixels included in the images 202A-202N. In some embodiments, the backbone networks 204A-N may be convolutional neural networks. For example, there may be 5, 10, 15, and so on, convolutional layers in each backbone network. In some embodiments, the backbone networks 204A-N may include residual blocks, recurrent neural network-regulated residual networks, and so on. Additionally, the backbone networks 204A-N may include weighted bi-directional feature pyramid networks (BiFPN). Output of the BiFPNs may represent multi-scale features determined based on the images 202A-202N. In some embodiments, Gaussian blur may be applied to portions of the images at training and/or inference time. For example, road edges may be peaky in that they are sharply defined in images. In this example, a Gaussian blur may be applied to the road edges to allow for bleeding of visual information such that they may be detectable by a convolutional neural network.

Additionally, certain of the backbone networks 204A-N may pre-process the images such as performing rectification, cropping, and so on.

The backbone networks 204A-N may thus output feature maps (e.g., tensors). In some embodiments, the output from the backbone networks 204A-N may be combined into a matrix or tensor. In some embodiments, the output may be provided as a multitude of tensors (e.g., 8 tensors in the illustrated example).

The output tensors from the backbone networks 204A-N may be combined (e.g., fused) together into a virtual camera space (e.g., a vector space) via multicam fusion 206 (e.g., an attention network). In the example described herein, the virtual camera space is a birds-eye view (e.g., top-down view). In some embodiments, the birds-eye view may extend laterally by about 70 meters, 80 meters, 100 meters, and so on. In some embodiments, the birds-eye view may extend longitudinally by about 80 meters, 100 meters, 120 meters, 150 meters, and so on.

For certain information determined by the network 200, the autonomous vehicle's kinematic information 206 may be used. Example kinematic information 206 may include the autonomous vehicles velocity, acceleration, yaw rate, and so on. In some embodiments, the images 202A-202H may be associated with kinematic information 206 determined for a time, or similar time, at which the images 202A-202H were obtained. For example, the kinematic information 206, such as velocity, yaw rate, acceleration, may be encoded (e.g., embedded into latent space), and associated with the images.

To ensure that objects can be tracked as an autonomous vehicle navigates, even while temporarily occluded, a video queue 210 can store output from the multicam fusion 206. For example, the output may be pushed into the queue 210 according to time and/or space. In this example, the time indexing may indicate that the queue 210 stores output based on passage of time (e.g., information is pushed at a particular frequency). Spatial indexing may indicate that the queue 210 stores output based on spatial movement of the vehicle. For example, as the vehicle moves in a direction the queue 210 may be updated after a threshold amount of movement (e.g., 0.2 meters, 1 meter, 3 meters, and so on). Optionally, the threshold amount of movement may be based on a location or speed of the vehicle. For example, navigation on city streets may allow for pushing information to the queue 210 after less movement than navigation on a freeway (e.g., at higher speed). In some embodiments, the queue 210 may store information determined based on images taken at 10-time stamps, 12-time stamps, 20-time stamps, and so on.

Output from the video queue 210 may be combined, for example with current output from multicam fusion 206, to form a tensor which is then processed by the remainder of the network 200. For example, frame alignment 208 may be performed. Frames may represent image frames taken at a same time or substantially same time by the image sensors. Thus, the alignment 208 may align frames taken at different times (e.g., the feature maps resulting from the frames). For example, frames may be selected according to their spatial index, and may be optionally aligned to correct for the autonomous vehicle's movement. For example, the alignment 208 may align features in the different indexed features (e.g., from the video queue 210). As an example, if the vehicle moved 20 meters ahead, then the alignment 208 may align information which includes, frame(s) 20 meters earlier (e.g., in the past). In this example, the features of those earlier frame(s) may be spatially shifted to align with the current features which are 20 m ahead. This can be done longitudinally and laterally at the same time, to ensure views are consistent/aligned.

In some embodiments, kinematic information associated with the autonomous vehicle executing the network 200 may optionally be input into the frame alignment 208 or be associated with the images 202A-N or feature maps from the multicam fusion 206. The kinematic information 206 may represent one or more of acceleration, velocity, yaw rate, turning information, braking information, and so on. Thus, the network 200 may encode this kinematic information for use in determining, as an example, output 214 from the network 200.

In the illustrated example, the feature maps are provided to example trunks (e.g., convolutional neural networks, attention networks) which output information to a downsample block. The downsample block provides feature maps to the autoregressive blocks 212 described below. As will be described the blocks 212 receive input including the feature maps that encodes all the images and outputs token which encodes where the lanes are. As described above, optionally the network 200 may output estimated trajectories of other vehicles or of the vehicle executing the network 200.

The network 200 includes autoregressive blocks 212. In the illustrated example, four autoregressive blocks are depicted. In some embodiments, 3 autoregressive blocks, 5 autoregressive blocks, and so on, may be used. The autoregressive blocks 212 may be similar to, for example, autoregressive blocks for language models (e.g., generative pre-trained transformer blocks, transformer blocks). The blocks 212 may autoregressively select tokens, which in this example are points of a real-world environment as represented in input to the blocks 12. The points may indicate points in a lane positioned about the autonomous vehicle.

For example, a first point may be predicted (e.g., an x, y point). In this example, a second point may be predicted (e.g., an x, y point) which is further from the autonomous vehicle and included in a same lane. Attributes for these points may optionally be predicted, for example a width of the lane, one or more splines which connect the first point to the second point, and so on. Subsequent points may be selected which are included in the lane, which may extend across one or more intersections. These points may optionally be separated by at least a particular distance (e.g., 5 meters, 10 meters, 25 meters, and so on). Once the lane is completed, for example once points in the lane have been identified, a subsequent lane may begin.

In this way, all lanes visible in the images 202A-202N may be characterized according to points, and optionally attributes, in the lanes. The points may be used to identify lane connectivity, for example across an intersection. That is, the output may indicate points which are determined to be in a same lane which may extend across an intersection. The network 200 may build open tokens, and the tokens may be fed back into the input to the autoregressive blocks 212 (e.g., along with the feature maps). In this way, the autoregressive blocks 212 autoregressively selects a new point for analysis.

In some embodiments, block 1 may cause selection of a portion of the real-world environment about the autonomous vehicle. For example, block 1 may receive input of the feature maps and output a location or coordinate (e.g., X, Y coordinate) associated with a bounding box or region about the portion. Block 2 may then refine that selection to a finer estimate. For example, block 1 may output a location or coordinate (e.g., X, Y coordinate) associated with a smaller bounding box or region (e.g., an interior box or region to the bounding box or region associated with block 1). As an example, block 2 may determine a smaller box or region conditioned on the information from block 1. Block 3 may then refine that finer estimate to a particular point which is included in a lane. For example, block 3 may output a location or coordinate (e.g., X, Y coordinate) associated with the point. While description above indicated that a bounding box or region may output by blocks 1-2, as may be appreciated different tokens may be used and fall within the scope of the disclosure hearing. For example, the tokens may represent more abstract data used by the network. As another example, the tokens may indicate a space between a particular coordinate and another coordinate. Block 4 may optionally characterize that particular point, for example indicating whether it's a merge point, forking point, and so on. Output of the blocks, such as block 4, may then be provided back to block 1 along with the feature maps.

The blocks 212 may additionally indicate whether a next point in the lane may be found or whether all points have been determined for the lane. In this way, a next lane may be selected and points for the next lane determined. In some embodiments, the autoregressive blocks 212 may be repeated using a for loop a threshold number of times (e.g., 64, 96, 108).

The output 214 may be generated via a forward pass through the lane connectivity network 200. In some embodiments, forward passes may be computed at a particular frequency (e.g., 20 Hz, 24 Hz, 30 Hz, and so on). In some embodiments, the particular frequency may be increased, or decreased, depending on a real-world environment. For example, the frequency may be decreased when on a freeway and increased when on city roads. The information from the network 200 may be used, for example, via a planning engine. As an example, the planning engine may determine driving actions to be performed by the autonomous vehicle (e.g., accelerations, turns, braking, and so on) based on the birds-eye view of the real-world environment.

In some embodiments, map information may be provided as an input to the lane connectivity network. For example, a raster or image of a map proximate to a location of the autonomous vehicle may be provided as an input. The map information may include a representation of lanes and optionally connectivity for the lanes. The map information. May optionally be provided as information which defines the lanes and connections. The network 200 may be trained to use this information, however it may be used as a hint to the network 200. For example, the information may be unreliable for some cities and the network 200 may rely upon the vision information (e.g., from the images 202A-202N) to determine lane connectivity. In some embodiments, the map data may be understood to be unreliable for a particular geographic region. The map data may optionally be input into the network 200 with a don't know signal such that the network 200 is trained to ignore the map.

To train the network, in some embodiments training data which has labels of a lane graph (e.g., points which form a lane) may be used. For example, labels for all lane lines may be used. Example labels may include a first color for a bidirectional lane, a second color for unidirectional, and so on. The points may optionally be spaced in the training data by a particular distance (e.g., 5 meters, 10 meters, 25 meters, and so on). For higher curvature lanes, more points may be used.

Figure 2B:
FIG. 2B is an example ground truth image used for training the lane connectivity network.

An example image used for training is illustrated in FIG. 2B. FIG. 2B illustrates an example image 220 with a multitude of lanes. These lanes are associated with points that form the lanes, with the points optionally being separated via one or more threshold distances. The image 220 is from a birds-eye view perspective as described herein, this view may be generated by a vehicle while it traverses a real-world area (e.g., the view may be generated via combining images depicting a substantially 360-degree view of the vehicle). Thus, the image 220 represents image data in line with an output of the network 200 described herein.

A system or a user may apply label information to the image 220 which forms ground truth associated with lane data. For example, different colors may be used to indicate different lanes or different types of lanes. With respect to type, there may be merge lanes, forking lanes, intersection lanes (e.g., lanes such as in the center which may not have visible markings, but which drivers would understand as forming lanes), and so on. As described above, tokens may be used to represent the points which form the lanes. During training, the network 200 will learn to associate these tokens with lanes depicted in the images such that a vehicle which is autonomously or semi-autonomously driving will be able to identify which lanes connect with which other lanes based on received image data.

Similar to the image 220, the network 200 may be trained based on information which depicts or indicates trajectories of the vehicle or vehicles which are proximate to the vehicle.

Block Diagram—Example Representations

FIGS. 3A-3D illustrate representations of use of the lane connectivity network described herein. The representation indicates points and associated characterizations or attributes on an image of a real-world area. As may be appreciated, the lane connectivity network may identify points (e.g., as described above) however these points would be associated with features projected onto a vector space (e.g., a birds-eye view). Thus, these figures are provided for illustration and indicate determined points included on the image.

Figure 3A:
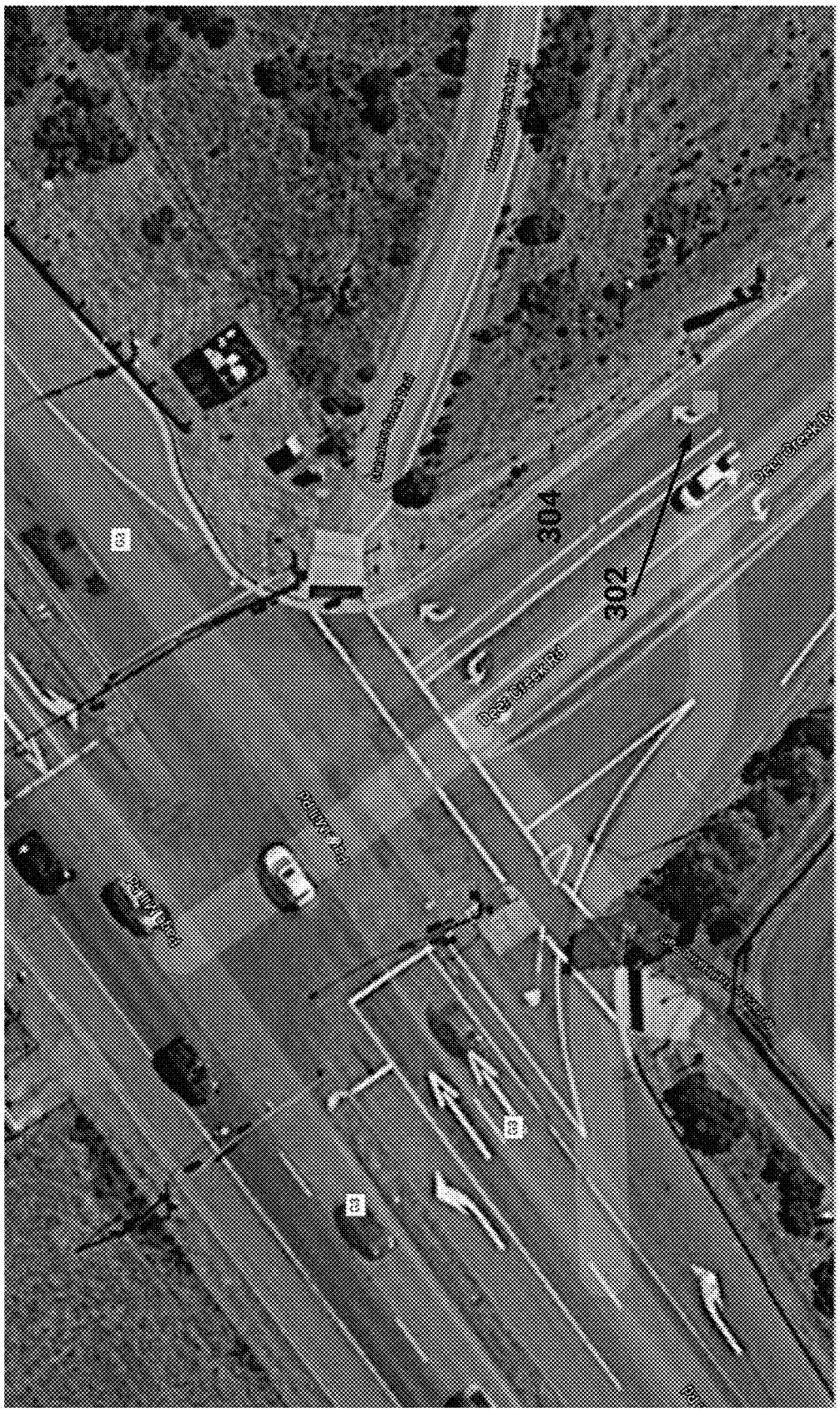
FIG. 3A is an example representation of determining a first lane connectivity point associated with the example lane connectivity network.

FIG. 3A is an example representation of determining a first lane connectivity point associated with the example lane connectivity network. In the illustrated example, the lane connectivity network 200 has obtained images of a real-world environment and determined that lane point 302 is included in a particular lane 304.

Figure 3B:
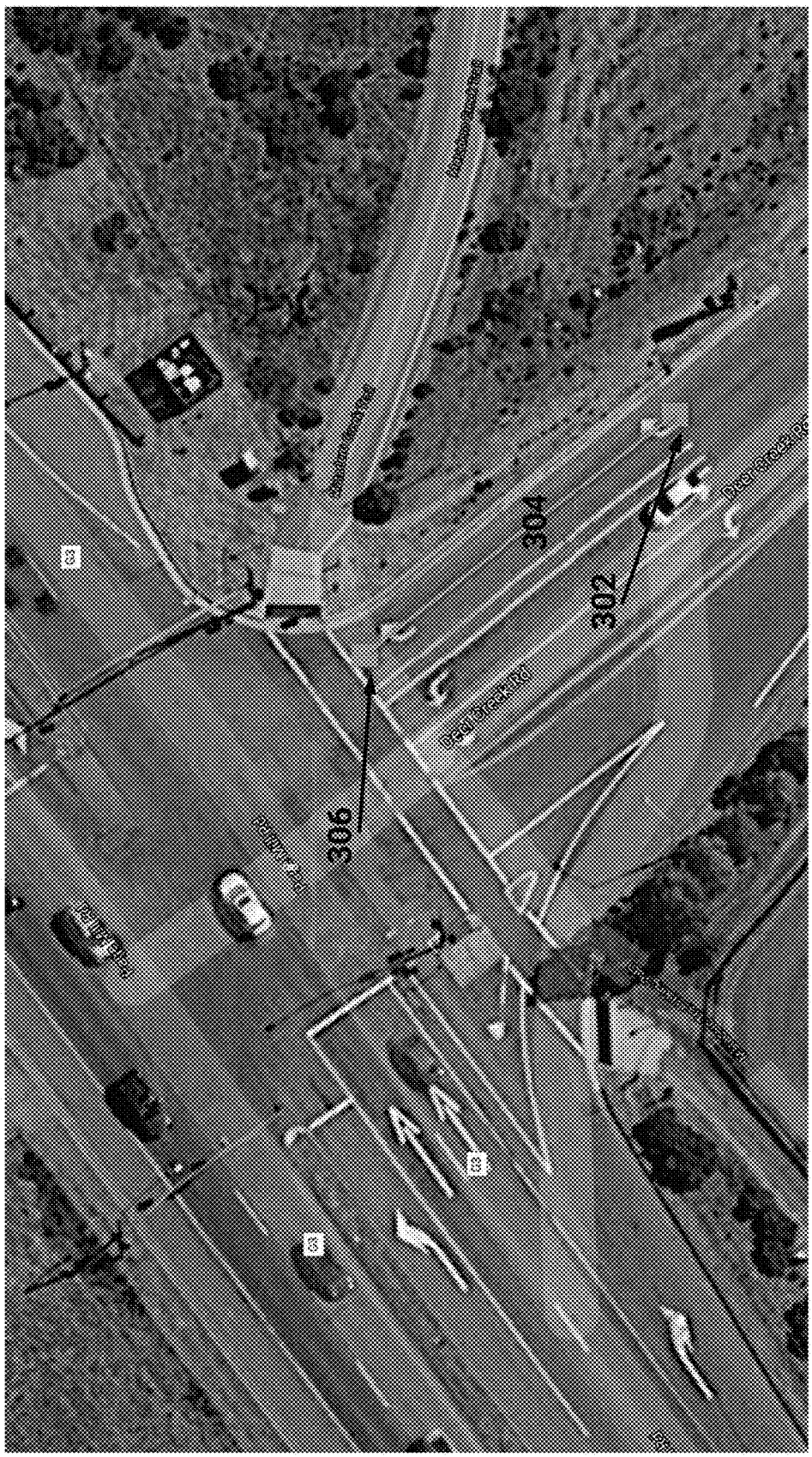
FIG. 3B is an example representation of determining a second lane connectivity point associated with the example lane connectivity network.

FIG. 3B is an example representation of determining a second lane connectivity point associated with the example lane connectivity network. The first lane point 302 may be autoregressively provided back to the network 200 (e.g., to the autoregressive blocks) and used to determine that second lane point 306 is included in the particular lane 304.

Figure 3C:
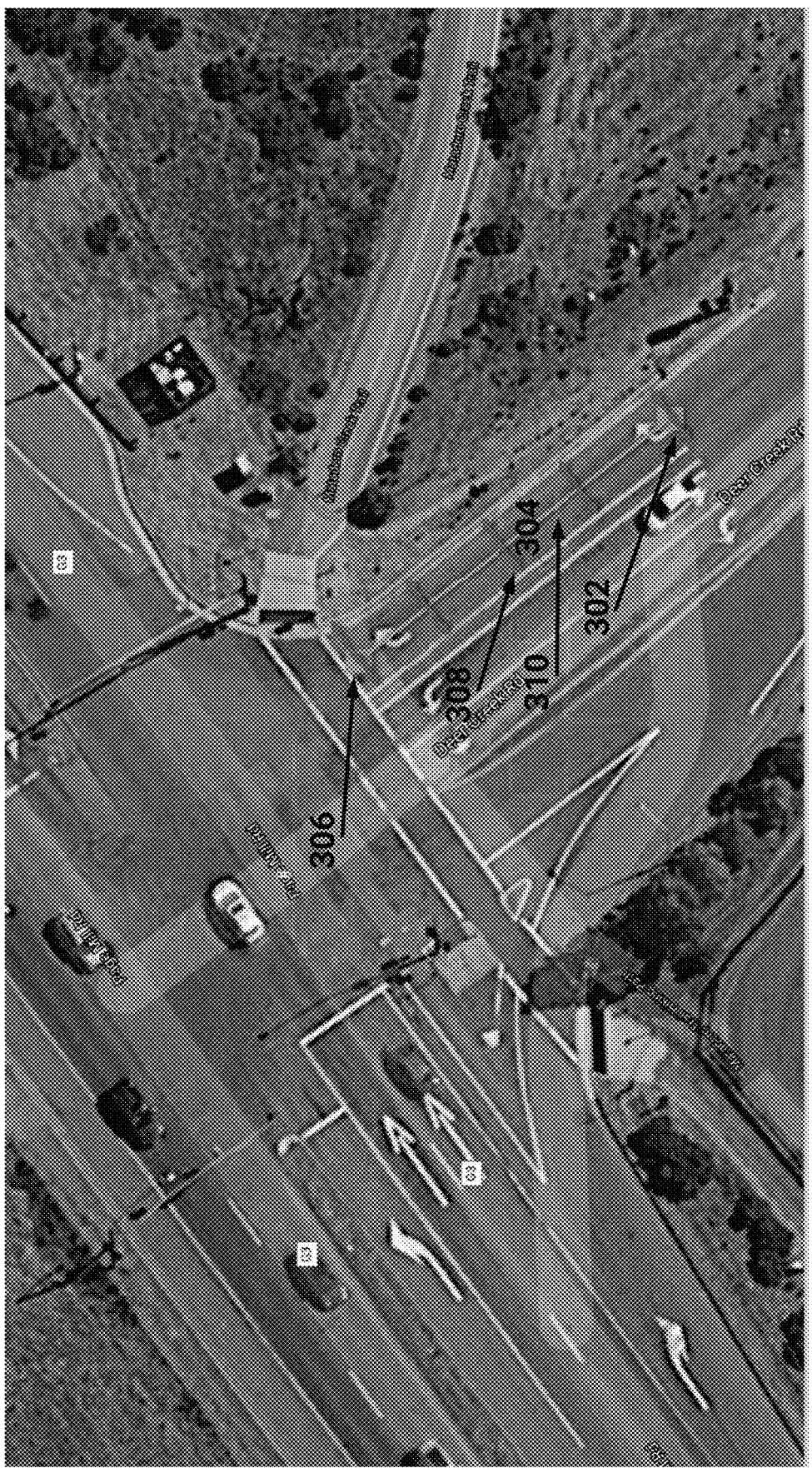
FIG. 3C is an example representation of determining lane connectivity attributes associated with the example lane connectivity network.

FIG. 3C is an example representation of determining lane connectivity attributes associated with the example lane connectivity network. Attributes associated with this lane may then be determined. Optionally the network 200 may determine attributes for pairs of successive points. Optionally, the network 200 may determine attributes for a lane portion (e.g., all points included in a lane portion) with the portion being defined based on distance (e.g., 20 meters, 50 meters) or being defined as being prior to or after an intersection.

In the illustrated example, the attributes include an estimated width 308 of the lane. The attributes additionally include a spline 310, or other connection, between the points 302, 306.

Figure 3D:
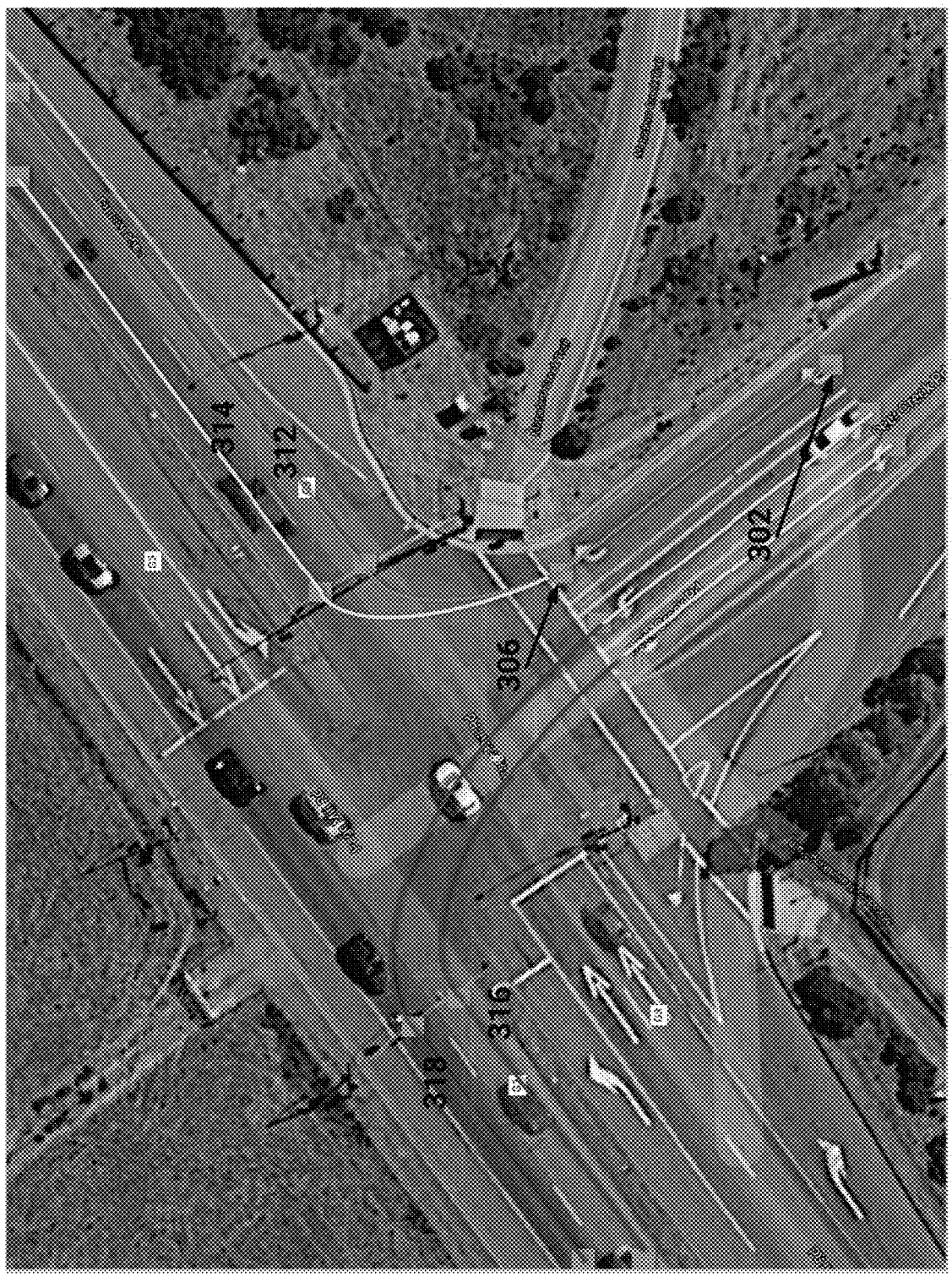
FIG. 3D is an example representation of lane connectivity determined via the example lane connectivity.

FIG. 3D is an example representation of lane connectivity determined via the example lane connectivity. The network 200 may autoregressively identify points in lanes, and then move onto subsequent lanes. In the illustrated example, points for each lane which a vehicle (e.g., traveling in one of the lanes in the lower right) may navigate to are depicted. For example, the vehicle may turn right into one of two lanes (e.g., lanes 312, 314). The vehicle may also turn left into one of two lanes (e.g., 316, 318).

Thus, two splines connect points 302 and 306 (e.g., described above) into lanes 312, 314. In this way, the vehicle may determine the options available to it in terms of lane connectivity.

Once all points in a lane (e.g., lane 304) are determined, the network 200 may characterize attributes of the lane. For example, the attributes may relate to routing type. Example attributes may include a directionality of the lane, merge information of the lane, and so on.

While an intersection is depicted, as may be appreciated the technique described herein does not require an intersection. For example, as a vehicle navigates along a two-lane road there may be an option to turn right off the road (e.g., without an intersection, for example with a unidirectional lane). Similar to the above, as the vehicle approaches the right turn the vehicle may determine points in a current lane and in the right lane as forming a lane connection.

Example Flowchart

Figure 4:
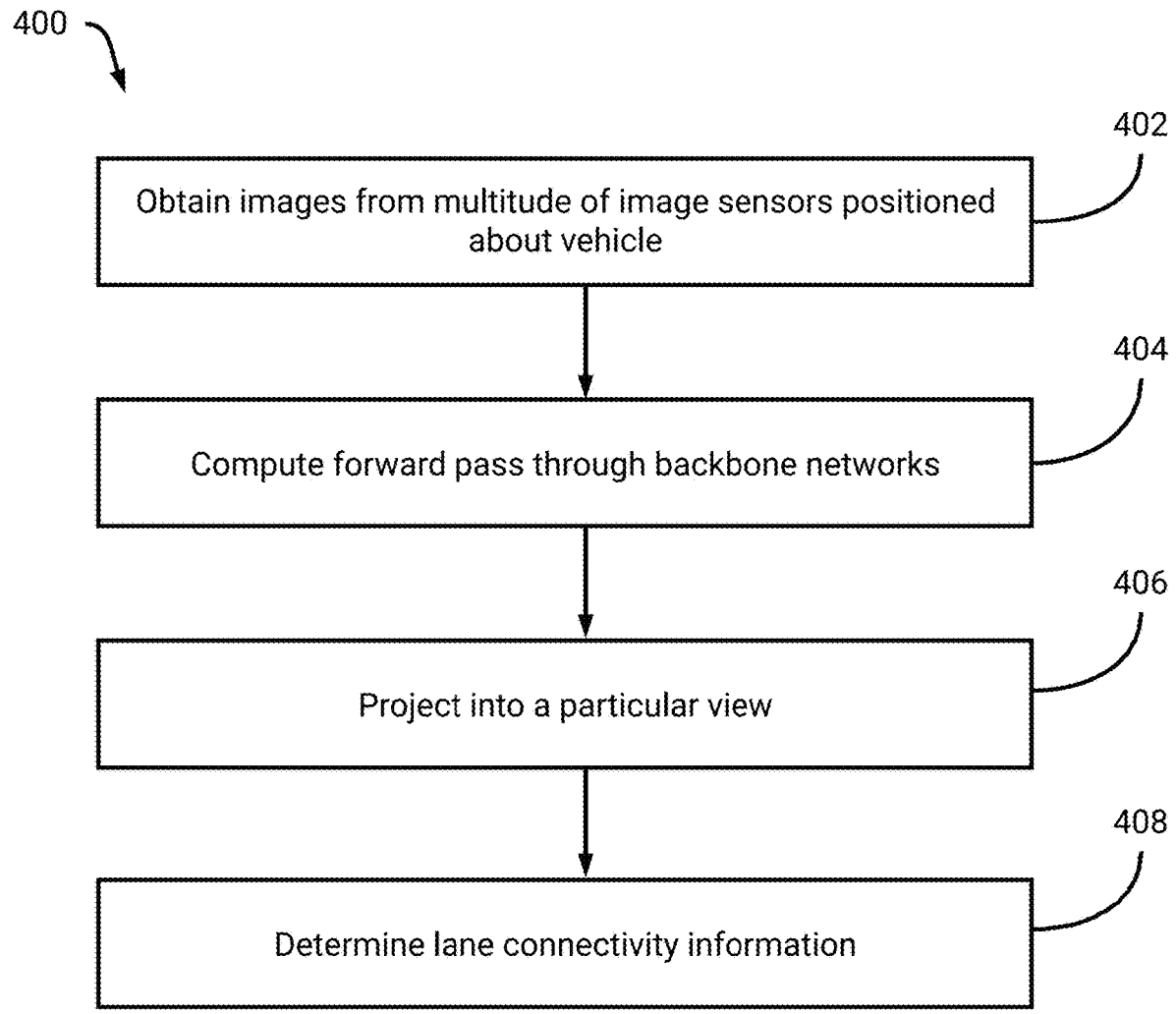
FIG. 4 is a flowchart of an example process for determining lane connectivity based on images obtained via an autonomous or semi-autonomous vehicle.

FIG. 4 is a flowchart of an example process 400 for determining lane connectivity based on images obtained via an autonomous or semi-autonomous vehicle. For convenience, the process 400 will be described as being performed by a system of one or more processors (e.g., the processor system 120, which may be included in a vehicle).

At block 402, the system obtains images from multitude of image sensors positioned about a vehicle. As described above, there may be 7, 8, 10, and so on, image sensors used to obtain images. At block 404, the system computes a forward pass-through backbone networks. The backbone networks may represent convolutional neural networks which optionally pre-process the images (e.g., rectify the images, crop the images, and so on).

At block 406, the system projects features determined from the images into a particular view (e.g., a birds-eye view). For example, a transformer network may project the features into a consistent vector space. In this example, the transformer network may be trained to associate features extracted from the images into the projection. Optionally, a forced projection step may precede the transformer network to, at least in part, cause the projection into the birds-eye view. The system may aggregate spatially and/or temporally indexed features from the transformer network, for example which were previously generated. As described above, a video module or video queue may be used to aggregate information. The information may be aligned as described herein.

At block 408, the system determines lane connectivity information. For example, the system determines points included in respective lanes (e.g., in lane lines) along with attributes or characterizations of the points and/or lanes. In this example, the points may be determined as a list of points (e.g., x, y points) along with attributes as described herein.

In some embodiments, the information determined by the birds-view network may be presented in a display of the vehicle. For example, the information may be used to inform autonomous driving (e.g., used by a planning and/or navigation engine) and optionally presented as a visualization for a driver or passenger to view. In some embodiments, the information may be used only as a visualization. For example, the driver or passenger may toggle an autonomous mode off.

Vehicle Block Diagram

Figure 5:
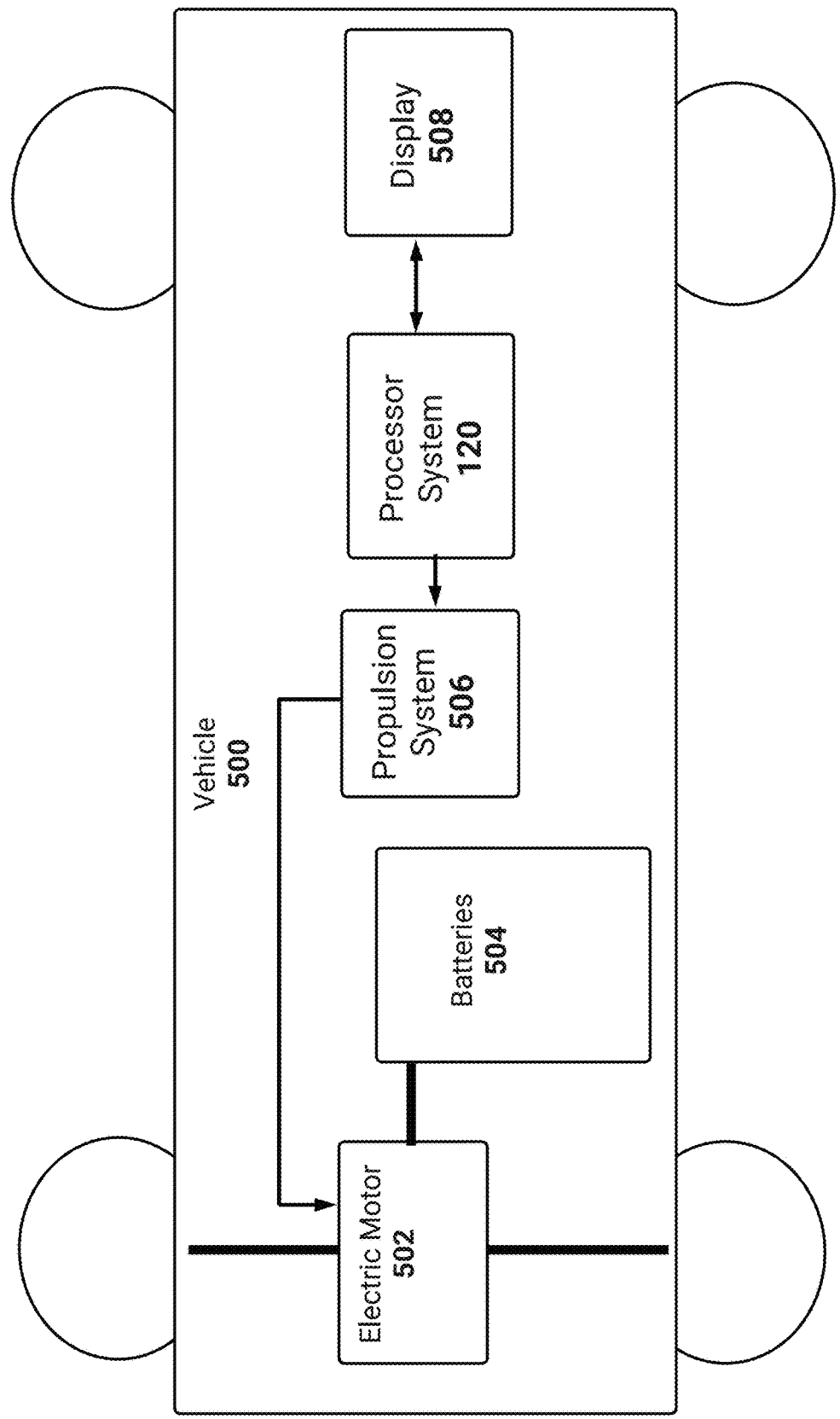
FIG. 5 is a block diagram illustrating an example vehicle which includes the example processor system.

FIG. 5 illustrates a block diagram of a vehicle 500 (e.g., vehicle 100). The vehicle 500 may include one or more electric motors 502 which cause movement of the vehicle 500. The electric motors 502 may include, for example, induction motors, permanent magnet motors, and so on. Batteries 504 (e.g., one or more battery packs each comprising a multitude of batteries) may be used to power the electric motors 502 as is known by those skilled in the art.

The vehicle 500 further includes a propulsion system 506 usable to set a gear (e.g., a propulsion direction) for the vehicle. With respect to an electric vehicle, the propulsion system 506 may adjust operation of the electric motor 502 to change propulsion direction.

Additionally, the vehicle includes the processor system 120 which processes data, such as images received from image sensors 102A-102F positioned about the vehicle 500. The processor system 120 may additionally output information to, and receive information (e.g., user input) from, a display 508 included in the vehicle 500. For example, the display may present lane connectivity information.

Other Embodiments

All of the processes described herein may be embodied in, and fully automated, via software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and engines described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A method implemented by a vehicle processor system, the method comprising:
   obtaining images from a multitude of image sensors positioned about a vehicle;
   computing forward pass-through backbone networks of a machine learning model for images received from at least one image sensor;
   fusing, by a transformer network that performs attention across respective backbone outputs, the backbone networks into a common representation;
   aggregating a time-indexed or spatially indexed queue of the fused common representation; and
   determining lane connectivity information associated with lanes positioned around the vehicle using the aggregated fused common representation.

2. The method of claim 1, wherein the backbone networks are convolutional neural networks configured to extract features from the images.

3. The method of claim 1, wherein the transformer network outputs three-dimensional features associated with a birds-eye view of the vehicle.

4. The method of claim 1, wherein determining lane connectivity information comprises autoregressively selecting tokens representing points which form lanes depicted in the images.

5. The method of claim 1, wherein determining lane connectivity information comprises:
   predicting, via one or more autoregressive blocks, a first point included in a first lane depicted in the images; and
   predicting remaining points in the first lane, wherein the predicted points which form the first lane are separated via a threshold distance.

6. The method of claim 5, further comprising:
   obtaining an end token associated with the first lane, and predicting a plurality of points included in a second lane depicted in the images.

7. The method of claim 5, wherein at least some the points which form the first lane are separated via an intersection.

8. The method of claim 5, wherein a last of the autoregressive blocks predicts whether a point is a merge point or forking point.

9. A system comprising one or more processors configured for inclusion in a vehicle, wherein the processors are configured to executed instructions which cause the processors to:
   obtain images from a multitude of image sensors positioned about a vehicle;
   compute forward pass-through backbone networks of a machine learning model for images received from at least one image sensor;
   fuse, by a transformer network that performs attention across respective backbone outputs, the backbone networks into a common representation;
   aggregate a time-indexed or spatially indexed queue of the fused common representation; and determine lane connectivity information using the aggregated fused common representation.

10. The system of claim 9, wherein the backbone networks are convolutional neural networks configured to extract features from the images.

11. The system of claim 9, wherein the transformer network outputs three-dimensional features associated with a birds-eye view of the vehicle.

12. The system of claim 9, wherein determining lane connectivity information comprises autoregressively selecting tokens representing points which form lanes depicted in the images.

13. The system of claim 9, wherein the instructions to determine lane connectivity information cause the processors to:
   predict, via one or more autoregressive blocks, a first point included in a first lane depicted in the images; and
   predict remaining points in the first lane, wherein the predicted points which form the first lane are separated via a threshold distance.

14. The system of claim 13, wherein the instructions further cause the processors to:
   obtain an end token associated with the first lane, and predicting a plurality of points included in a second lane depicted in the images.

15. The system of claim 13, wherein at least some the points which form the first lane are separated via an intersection.

16. The system of claim 13, wherein a last of the autoregressive blocks predicts whether a point is a merge point or forking point.

17. Non-transitory computer storage media storing instructions that when executed by a system of one or more computers, cause the one or more computers to perform operations comprising:
   obtaining images from a multitude of image sensors positioned about a vehicle;
   computing forward pass-through backbone networks of a machine learning model for images received from at least one image sensor;
   fusing, by a transformer network that performs attention across respective backbone outputs, the backbone networks into a common representation;
   aggregating a time-indexed or spatially indexed queue of the fused common representation; and
   determining lane connectivity information using the aggregated fused common representation comprising:
      predicting, via one or more autoregressive blocks, a plurality of points included in a first lane depicted in the images, wherein at least a subset of the predicted points which form the first lane are separated via a threshold distance.

18. The computer storage media of claim 17, wherein the operations further comprise:
   obtaining an end token associated with the first lane, and predicting a plurality of points included in a second lane depicted in the images.

19. The computer storage media of claim 17, wherein at least some the points which form the first lane are separated via an intersection.

20. The computer storage media of claim 17, wherein a last of the autoregressive blocks predicts whether a point is a merge point or forking point.

* * * * *